(12) United States Patent
Plotke

(10) Patent No.: US 8,787,114 B1
(45) Date of Patent: Jul. 22, 2014

(54) AUDIO SURVEILLANCE SYSTEM

(75) Inventor: Leonard Alan Plotke, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 627 days.

(21) Appl. No.: 13/036,142

(22) Filed: Feb. 28, 2011

Related U.S. Application Data

(63) Continuation-in-part of application No. 12/880,370, filed on Sep. 13, 2010, now Pat. No. 8,620,023, and a continuation-in-part of application No. 13/011,354, filed on Jan. 21, 2011, now Pat. No. 8,451,174.

(51) Int. Cl.
*G01S 3/802* (2006.01)

(52) U.S. Cl.
USPC .......................................................... 367/119

(58) Field of Classification Search
USPC .......................................................... 367/119
See application file for complete search history.

(56) References Cited

U.S. PATENT DOCUMENTS

| | | | |
|---|---|---|---|
| 4,173,017 A | 10/1979 | Burlage et al. | |
| 4,253,670 A | 3/1981 | Moulton et al. | |
| 4,866,438 A | 9/1989 | Knisch | |
| 5,123,327 A | 6/1992 | Alston et al. | |
| 5,546,360 A * | 8/1996 | Deegan | 367/150 |
| 5,734,337 A | 3/1998 | Kupersmit | |
| 5,735,497 A | 4/1998 | Haas et al. | |
| 5,960,097 A | 9/1999 | Pfeiffer et al. | |
| 6,205,231 B1 | 3/2001 | Isadore-Barreca et al. | |
| 6,222,492 B1 | 4/2001 | Mahon | |
| 6,266,442 B1 | 7/2001 | Laumeyer et al. | |
| 6,363,161 B2 | 3/2002 | Laumeyer et al. | |
| 6,449,384 B2 | 9/2002 | Laumeyer et al. | |
| 7,552,008 B2 | 6/2009 | Newstrom et al. | |
| 7,623,248 B2 | 11/2009 | Laflamme | |
| 8,125,850 B2 * | 2/2012 | Guigne et al. | 367/119 |
| 8,160,452 B1 | 4/2012 | Tidwell et al. | |
| 8,395,665 B2 | 3/2013 | Otani et al. | |
| 8,451,174 B1 * | 5/2013 | Plotke | 342/450 |
| 8,620,023 B1 * | 12/2013 | Plotke | 382/103 |
| 2001/0011957 A1 | 8/2001 | Mitchell et al. | |
| 2002/0106109 A1 | 8/2002 | Retterath et al. | |
| 2002/0113872 A1 | 8/2002 | Kinjo | |
| 2002/0167445 A1 | 11/2002 | Eden | |
| 2005/0119030 A1 | 6/2005 | Bauchot et al. | |
| 2005/0288911 A1 | 12/2005 | Proikli | |
| 2006/0002590 A1 | 1/2006 | Borak | |
| 2006/0007308 A1 | 1/2006 | Ide et al. | |
| 2006/0055521 A1 | 3/2006 | Blanco et al. | |

(Continued)

OTHER PUBLICATIONS

U.S. Notice of Allowance dated Aug. 30, 2013 in U.S. Appl. No. 12/880,370.

(Continued)

*Primary Examiner* — Daniel Pihulic
(74) *Attorney, Agent, or Firm* — Hope Baldauff, LLC

(57) ABSTRACT

A method and apparatus are provided for detecting objects of interest using sounds. Sounds are monitored for using a sensor array. A number of beams are formed. Each beam in the number of beams is formed for a selected direction in which the selected direction for each beam is relative to a line of sight for the sensor array. A presence of a number of objects of interest is identified using the number of beams and the sounds detected by the sensor array.

22 Claims, 16 Drawing Sheets

(56) References Cited

U.S. PATENT DOCUMENTS

| | | |
|---|---|---|
| 2007/0057840 A1 | 3/2007 | Thomas et al. |
| 2008/0122693 A1 | 5/2008 | Needham et al. |
| 2008/0129599 A1 | 6/2008 | Thomas et al. |
| 2008/0148931 A1 | 6/2008 | Svensson et al. |
| 2009/0262197 A1 | 10/2009 | Nakamura |
| 2009/0310664 A1 | 12/2009 | Yannone |
| 2010/0172543 A1 | 7/2010 | Winkler |
| 2010/0207738 A1 | 8/2010 | Bloy |
| 2010/0219953 A1 | 9/2010 | Bloy |
| 2011/0012719 A1 | 1/2011 | Hilger et al. |
| 2011/0026007 A1 | 2/2011 | Gammenthaler |

OTHER PUBLICATIONS

U.S. Office Action dated Dec. 11, 2012 in U.S. Appl. No. 12/880,370.
U.S. Notice of Allowance dated Mar. 26, 2013 in U.S. Appl. No. 13/011,354.
U.S. Final Office Action dated Jun. 14, 2013 in U.S. Appl. No. 12/880,370.
U.S. Appl. No. 12/563,414, filed Sep. 21, 2009 by Plotke et al.
U.S. Office Action dated Feb. 15, 2012 in U.S. Appl. No. 12/563,414.
U.S. Notice of Allowance dated May 21, 2012 in U.S. Appl. No. 12/563,414.
U.S. Office Action dated Nov. 8, 2012 in U.S. Appl. No. 13/011,354.

* cited by examiner

AUDIO SURVEILLANCE SYSTEM

CROSS-REFERENCE TO RELATED APPLICATIONS

This patent application is a continuation-in-part of U.S. patent application Ser. No. 12/880,370 entitled "Object Detection and Location System," filed Sep. 13, 2010, now U.S. Pat. No. 8,620,023 issued on Dec. 31, 2013, and U.S. patent application Ser. No. 13/011,354 entitled "Beam-Scanning System," filed Jan. 21, 2011, now U.S. Pat. No. 8,451,174, issued on May 28, 2013, which are incorporated herein by reference in their entirety.

BACKGROUND INFORMATION

1. Field

The present disclosure relates generally to audio surveillance and, in particular, to listening to sounds to detect objects of interest. Still more particularly, the present disclosure relates to detecting, locating, and tracking objects of interest when listening to sounds.

2. Background

Different types of surveillance operations may include audio surveillance operations. Audio surveillance comprises listening for sounds in an area. Further, audio surveillance may include identifying objects of interest from which sounds that are detected originate.

Currently available systems for performing audio surveillance operations typically use microphones to listen for sounds. Oftentimes, these microphones are omnidirectional microphones. Omnidirectional microphones are configured to detect sounds that are coming from a number of directions. These types of microphones may not be able to distinguish between sounds that are coming from one direction and sounds that are coming from another direction. Further, sounds coming from one object of interest may not be distinguishable from sounds coming from another object of interest.

Additionally, with the use of an omnidirectional microphone, the location of an object of interest from which a sound originates may not be able to be identified using the omnidirectional microphone. Further, without knowing the location for the object of interest, movement of the object of interest may not be able to be tracked.

Therefore, it would be advantageous to have a method and apparatus that takes into account some of the issues discussed above, as well as other possible issues.

SUMMARY

In one advantageous embodiment, a method is provided for detecting objects of interest using sounds. Sounds are monitored for using a sensor array. A number of beams are formed. Each beam in the number of beams is formed for a selected direction in which the selected direction for the each beam is relative to a line of sight for the sensor array. A presence of a number of objects of interest is identified using the number of beams and the sounds detected by the sensor array.

In another advantageous embodiment, an apparatus comprises a sensor array and a computer system associated with the sensor array. The sensor array is configured to monitor for sounds. The computer system is configured to form a number of beams. Each beam in the number of beams is formed for a selected direction in which the selected direction for each beam is relative to a line of sight for the sensor array. A presence of a number of objects of interest is identified using the number of beams and the sounds detected by the sensor array.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that it may be desirable to have an audio surveillance system that is capable of detecting sounds that originate from objects of interest, locating the objects of interest, and tracking the movement of the objects of interest.

The different advantageous embodiments recognize and take into account that one type of solution comprises integrating a microphone at the focal point of a parabolic reflector. A parabolic reflector is a reflective device, such as a dish or a mirror, configured to collect and/or project energy. This energy may be in the form of, for example, without limitation, sounds waves. The parabolic reflector may be moved using a gimbal configured to move with respect to two axes.

The different advantageous embodiments recognize that this solution may allow a direction from which a sound is detected to be identified. However, the different advantageous embodiments recognize that this solution may not allow the direction from which the sound originates to be identified. Further, this solution may not allow movement of an object of interest generating the sound that is detected to be tracked.

Still further, the different advantageous embodiments recognize and take into account that currently available systems for detecting sounds are not capable of locating and tracking objects of interest while scanning for sounds originating from other objects of interest.

Thus, the different advantageous embodiments provide a method and apparatus for detecting objects of interest using sounds. Sounds are monitored for using a sensor array. A number of beams are formed. Each beam in the number of beams is formed for a selected direction in which the selected direction for each beam is relative to a line of sight for the sensor array. A presence of a number of objects of interest is identified using the number of beams and the sounds detected by the sensor array.

Figure 1:
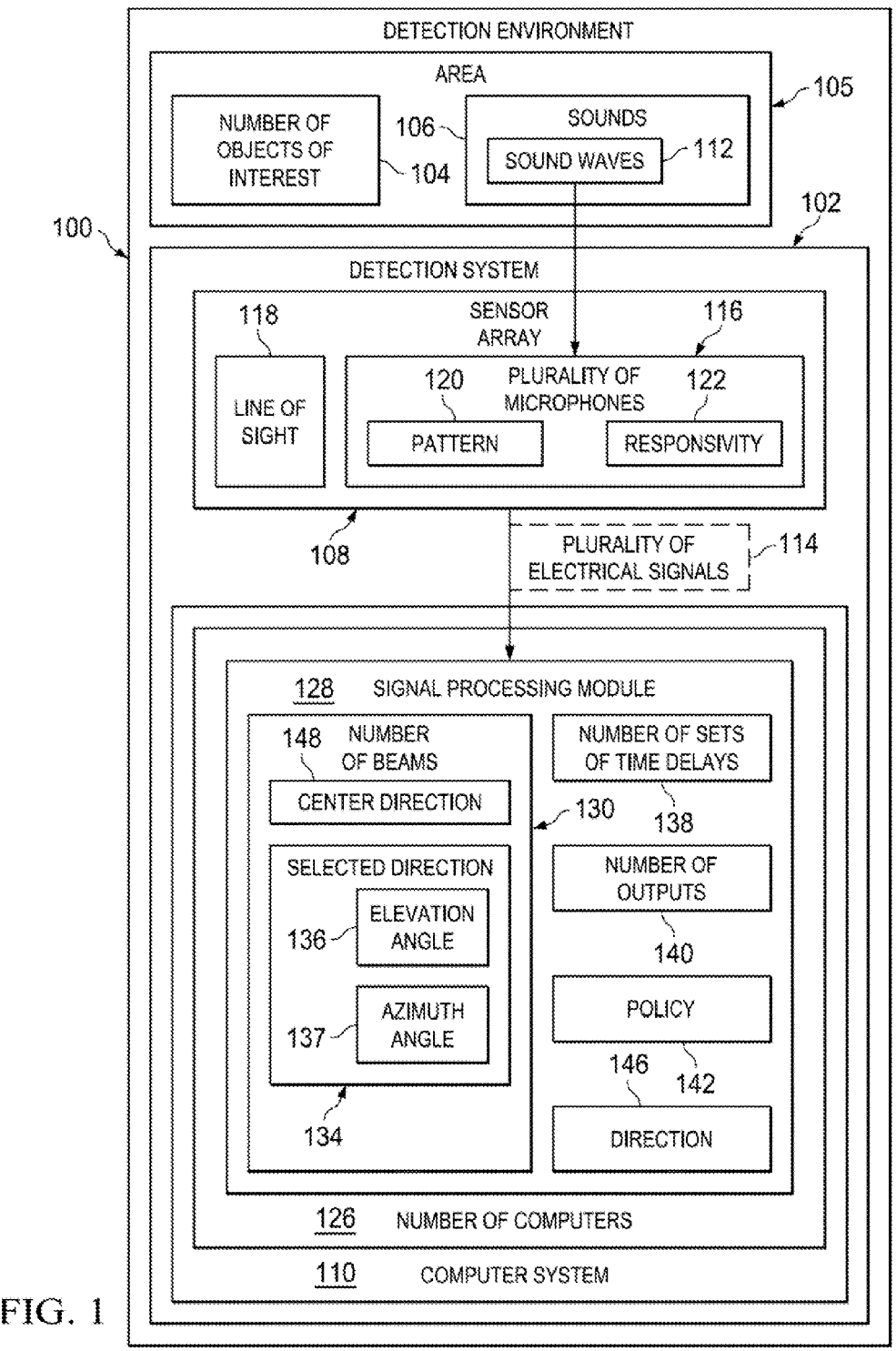
FIG. 1 is an illustration of a detection environment in accordance with an advantageous embodiment.

With reference now to FIG. 1, an illustration of a detection environment is depicted in accordance with an advantageous embodiment. Detection environment 100 in FIG. 1 may be one example of an environment in which the different advantageous embodiments may be implemented.

In these illustrative examples, detection environment 100 includes detection system 102. Detection system 102 is configured to detect number of objects of interest 104 in area 105 using sounds 106. Number of objects of interest 104 may include, for example, people, vehicles, weapons, fire, explosions, submarines, aircraft, ground vehicles, animals, and/or other suitable objects of interest. Area 105 may be, for example, without limitation, a neighborhood, a town, a building, a city block, a location behind a building, or some other type of area in which number of objects of interest 104 may be present.

As depicted, detection system 102 comprises sensor array 108 and computer system 110. Sensor array 108 is an array of sensors configured to detect sounds 106. In particular, sensor array 108 is an array of sensors configured to generate plurality of electrical signals 114 in response to detecting sounds 106 in the form of sound waves 112. As depicted, sensor array 108 comprises plurality of microphones 116.

In these illustrative examples, plurality of microphones 116 are omnidirectional microphones configured to generate plurality of electrical signals 114. In other illustrative examples, plurality of microphones 116 may be selected from a group comprising at least one of an omnidirectional microphone, a piezoelectric microphone, a semiconductor-type microphone, a unidirectional microphone, and/or other suitable types of microphones.

All of plurality of microphones 116 for sensor array 108 may lie in one plane in these depicted examples. Further, sensor array 108 has line of sight 118. Line of sight 118 is a center axis through sensor array 108 that is substantially perpendicular to the plane through sensor array 108. Additionally, plurality of microphones 116 in sensor array 108 is arranged in pattern 120. Pattern 120 may be, for example, without limitation, a hexagonal pattern, a square pattern, a triangular pattern, a circular pattern, or some other suitable type of pattern.

In these depicted examples, each microphone in plurality of microphones 116 has responsivity 122. Responsivity is a measure of the gain of a system. For example, responsivity 122 for a microphone in plurality of microphones 116 is the gain for the microphone. In other words, responsivity 122 is the ratio of plurality of electrical signals 114 that are output by the microphone to sounds 106 detected by the microphone. Responsivity 122 for each microphone in plurality of microphones 116 may depend on a number of factors. These factors may include, for example, without limitation, the frequency of sounds 106 detected, the direction relative to line of sight 118 from which sounds 106 are detected, temperature, and the amplitude of sounds 106 detected.

Plurality of microphones 116 sends plurality of electrical signals 114 to computer system 110 for processing. In these illustrative examples, computer system 110 takes the form of number of computers 126. As illustrated, signal processing module 128 is implemented in computer system 110. In particular, signal processing module 128 is implemented in one or more of number of computers 126. Signal processing module 128 may be implemented using at least one of software components, hardware components, and firmware components.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In these illustrative examples, signal processing module 128 may include a microprocessor, such as a digital signal processor (DSP). Signal processing module 128 receives plurality of electrical signals 114 for processing. Signal processing module 128 forms number of beams 130 for processing plurality of electrical signals 114. A beam is the responsivity for sensor array 108 with respect to a selected direction relative to line of sight 118 for sensor array 108.

For example, each beam in number of beams 130 is formed for selected direction 134 relative to line of sight 118. Selected direction 134 comprises elevation angle 136 relative to line of sight 118 and azimuth angle 137 relative to line of sight 118. In these examples, selected direction 134 may be different for each beam in number of beams 130.

In these illustrative examples, when a beam is formed for selected direction 134, plurality of microphones 116 has a highest responsivity 122 for sounds detected as coming from substantially selected direction 134 for that beam. Further, responsivity 122 for plurality of microphones 116 decreases as the sounds move away from selected direction 134 in elevation angle 136 and/or azimuth angle 137.

When processing plurality of electrical signals 114, signal processing module 128 takes into account that sound waves 112 traveling in selected direction 134 towards sensor array 108 may not reach all of plurality of microphones 116 at substantially the same time, depending on selected direction 134.

For example, when elevation angle 136 and azimuth angle 137 for selected direction 134 are equal to about zero degrees relative to line of sight 118, a sound wave is detected by all of plurality of microphones 116 at substantially the same time. However, when at least one of elevation angle 136 and azimuth angle 137 are not about zero degrees relative to line of sight 118, the sound wave may be detected by different microphones in plurality of microphones 116 at different times.

Signal processing module 128 forms number of beams 130 using beamforming techniques. Beamforming uses interference to change the directionality of sensor array 108 such that a beam can be formed for selected direction 134. For example, in forming a beam in number of beams 130, time delays are applied to plurality of electrical signals 114 from plurality of microphones 116 such that every electrical signal reaches an output at exactly the same time to form a combined signal.

The time delays applied to plurality of electrical signals 114 are substantially equivalent to phase shifts. Each of plurality of microphones 116 is shifted by a different amount, depending on selected direction 134, such that sensor array 108 is a phased array.

Signal processing module 128 identifies number of sets of time delays 138 to form number of beams 130 based on selected direction 134 for each beam in number of beams 130. Number of sets of time delays 138 is identified such that plurality of electrical signals 114 may be processed as if sound waves 112 are being detected by all of plurality of microphones 116 at substantially the same time.

In these illustrative examples, signal processing module 128 applies each set of time delays in number of sets of time delays 138 to plurality of electrical signals 114 to form a particular beam in number of beams 130 for the corresponding selected direction for the beam. In these examples, each set of time delays may include time delays for some or all of plurality of electrical signals 114.

After applying number of sets of time delays 138 to plurality of electrical signals 114, signal processing module 128 sums plurality of electrical signals 114 together to form number of outputs 140. In other words, number of beams 130 is formed such that sensor array 108 is configured to detect sounds 106 coming from predominately selected direction 134 for each of number of beams 130 such that number of outputs 140 corresponds to the sounds detected coming from predominately selected direction 134.

In these illustrative examples, for an object of interest generating sounds in selected direction 134, the output for the beam directed in selected direction 134 is a maximum output for that object of interest. The output decreases as the object of interest moves away from selected direction 134 in elevation angle 136 and/or azimuth angle 137.

Signal processing module 128 uses number of outputs 140 and policy 142 to identify the presence of number of objects of interest 104. Policy 142 may include a number of rules, criteria, guidelines, and/or other information for identifying number of objects of interest 104.

For example, signal processing module 128 may identify the presence of an object of interest when an output in number of outputs 140 for a particular beam is greater than some selected threshold based on policy 142. In some illustrative examples, policy 142 may indicate that an object of interest may be identified as present when each of a selected portion of number of outputs 140 is greater than some selected threshold.

In response to identifying the presence of number of objects of interest 104, signal processing module 128 may be used to perform a number of operations. These operations may include, for example, without limitation, identifying direction 146 for number of objects of interest 104, tracking movement of number of objects of interest 104 based on sounds 106 detected, redirecting number of beams 130, and/or other suitable types of operations.

In these illustrative examples, direction 146 for number of objects of interest 104 is a direction relative to line of sight 118 for sensor array 108 in which number of objects of interest 104 is present. Direction 146 may comprise an elevation angle and azimuth angle with respect to line of sight 118. In these examples, direction 146 is an approximate direction in which number of objects of interest 104 may be present.

Signal processing module 128 may change selected direction 134 for at least a portion of the beams in number of beams 130 based on direction 146 for number of objects of interest 104. In these examples, at least a portion of beams means one, some, or all of the beams.

For example, signal processing module 128 may change selected direction 134 for each beam in number of beams 130 based on direction 146 for number of objects of interest 104 such that center direction 148 for number of beams 130 is substantially the same as direction 146. In these illustrative examples, center direction 148 for number of beams 130 may be an elevation angle and an azimuth angle relative to line of sight 118 that is substantially equidistant from the elevation angles and azimuth angles, respectively, for selected direction 134 for each of number of beams 130.

In these different advantageous embodiments, direction 146 identified for number of objects of interest 104 may be used with other information for number of objects of interest 104 identified using, for example, a visual detection system, to identify a position for number of objects of interest 104. The position may be identified with respect to a geographical coordinate system, for example.

The illustration of detection environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, an amplifier system may be present. The amplifier system may comprise a plurality of amplifiers configured to receive plurality of electrical signals 114 from plurality of microphones 116 and amplify plurality of electrical signals 114 prior to sending plurality of electrical signals 114 to signal processing module 128.

Further, in some illustrative examples, a calibration system may be present. The calibration system may include, for example, calibration speakers that bathe each microphone in plurality of microphones 116 with an input sound signal. Plurality of microphones 116 are calibrated to adjust the responsivity for each microphone in plurality of microphones 116 based on the responsivity for each microphone for the input sound signal. In this manner, plurality of microphones 116 may be calibrated to take into account factors that may affect responsivity. The calibration may be performed periodically during operation of sensor array 108.

Figure 2:
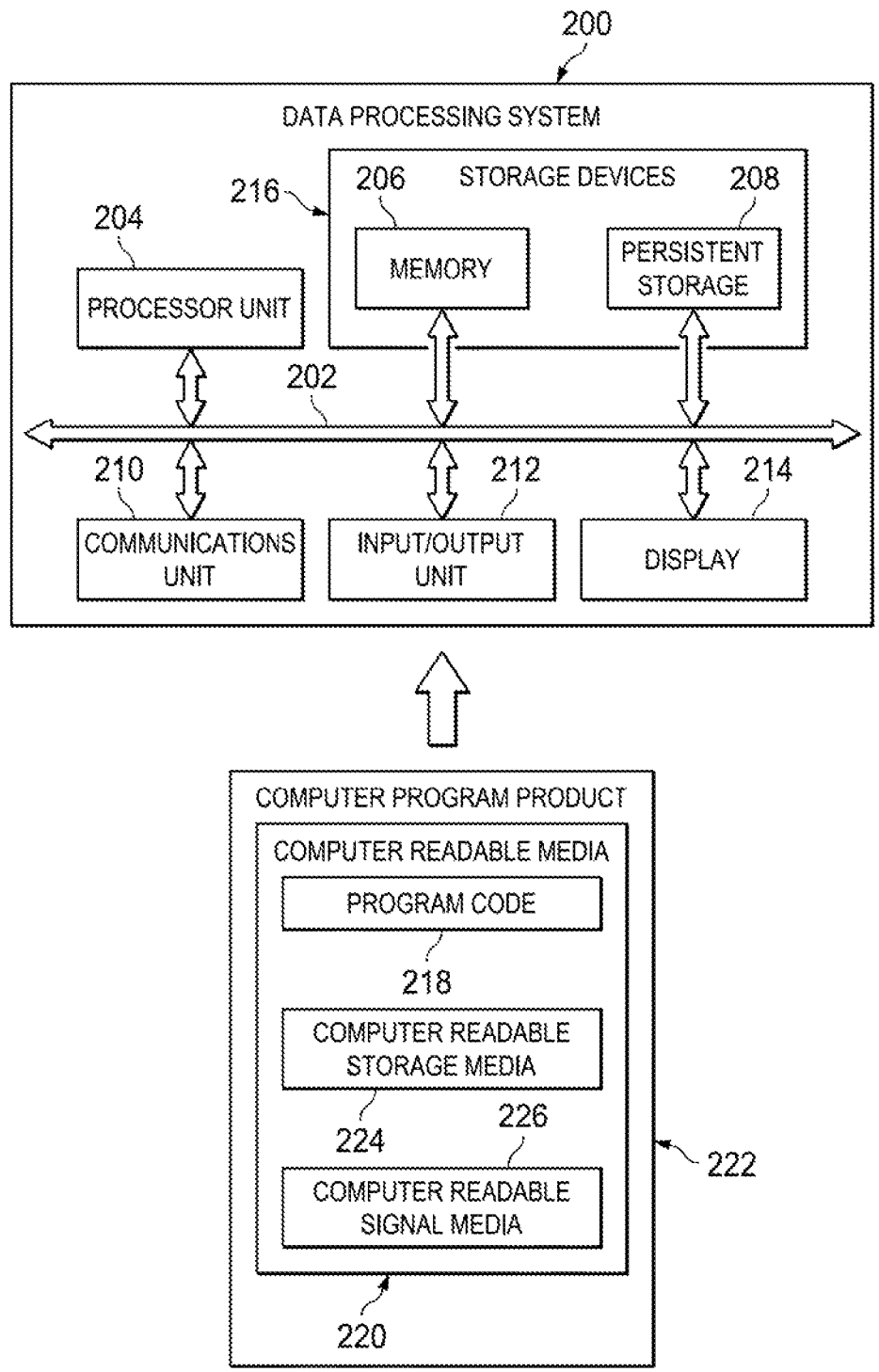
FIG. 2 is an illustration of a data processing system in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218, rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations.

With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted, because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications fabric 202.

Figure 3:
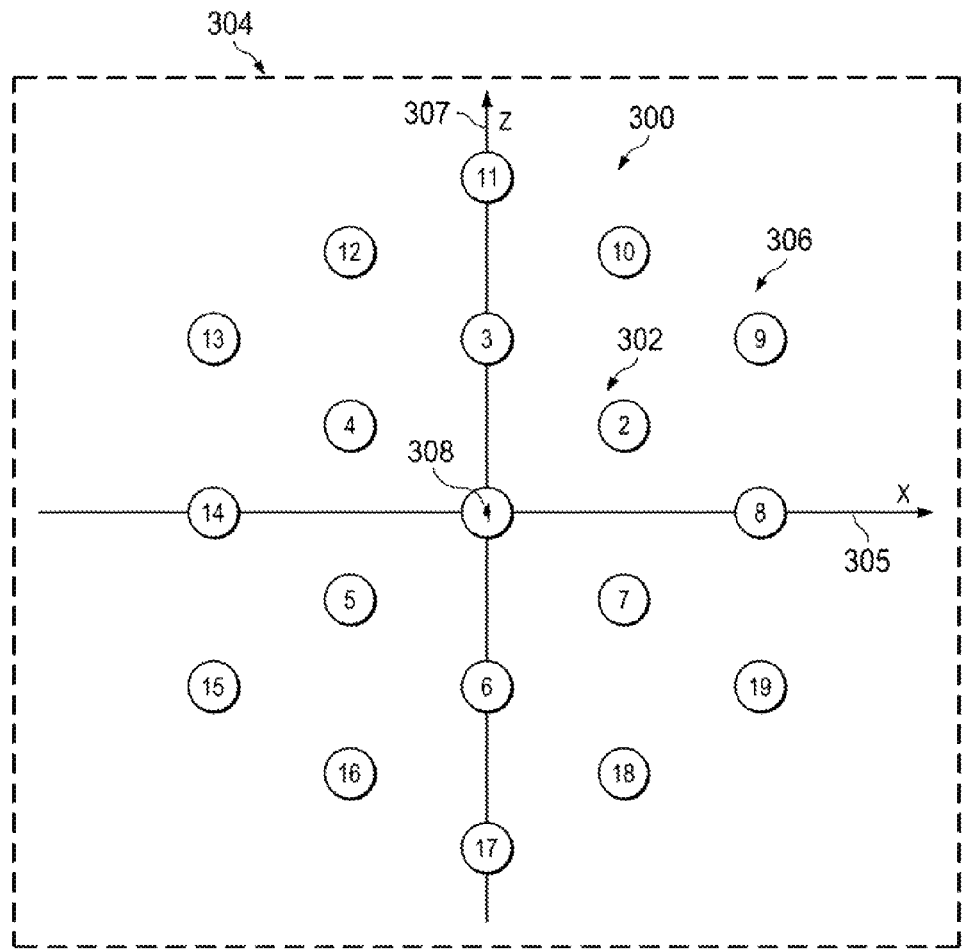
FIG. 3 is an illustration of a sensor array in accordance with an advantageous embodiment.

With reference now to FIG. 3, an illustration of a sensor array is depicted in accordance with an advantageous embodiment. In this illustrative example, sensor array 300 is an example of one implementation for sensor array 108 in FIG. 1. As depicted, sensor array 300 comprises plurality of microphones 302. Plurality of microphones 302 includes 19 microphones in this illustrative example.

In this illustrative example, all microphones in plurality of microphones 302 lie in plane 304. Plane 304 is formed by x-axis 305 and z-axis 307. A y-axis, not shown, is substantially perpendicular to plane 304. Further, plurality of microphones 302 are arranged in hexagonal pattern 306. Hexagonal pattern 306 has rotational symmetry about line of sight 308 for sensor array 300. Line of sight 308 is a center axis for sensor array 300 and is substantially perpendicular to plane 304. In other words, line of sight 308 is in line with the y-axis.

The field of regard for sensor array 300 and each microphone in plurality of microphones 302 is a range of about 180 degrees in azimuth angle and a range of about 180 degrees in elevation angle. The field of regard includes all of the angular directions from which sounds may be detected. These angular directions correspond to the directions for which beams may be formed for sensor array 300.

Figure 4:
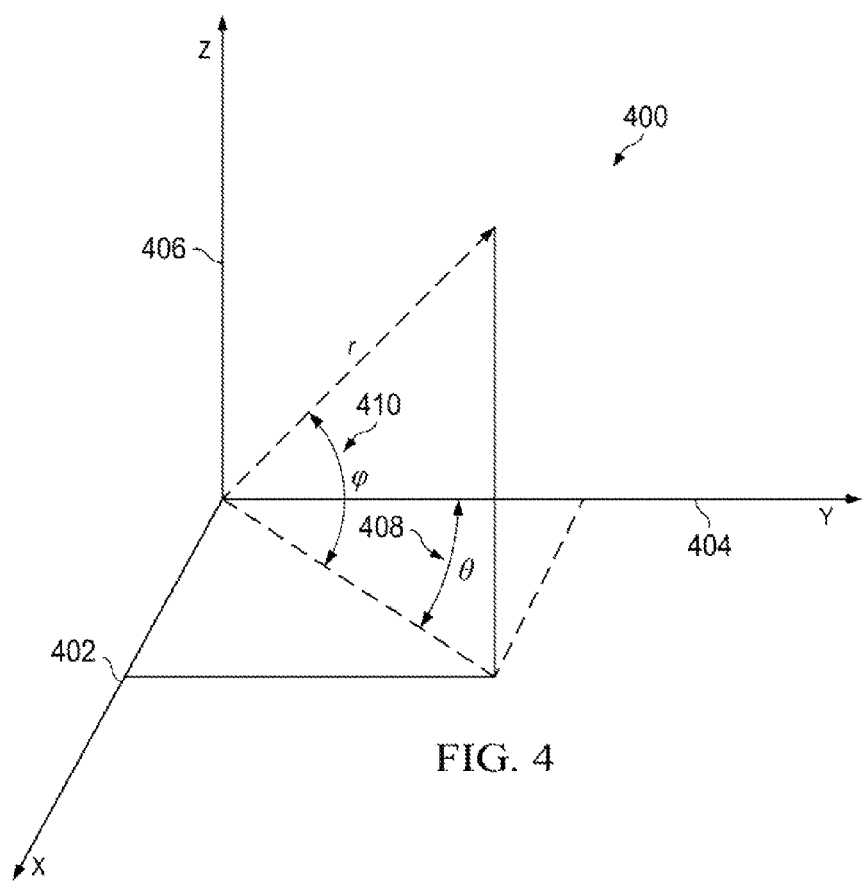
FIG. 4 is an illustration of a coordinate system for a sensor array in accordance with an advantageous embodiment.

With reference now to FIG. 4, an illustration of a coordinate system for a sensor array is depicted in accordance with an advantageous embodiment. In this illustrative example, coordinate system 400 is an example of a coordinate system for a sensor array, such as sensor array 108 in FIG. 1 and/or sensor array 300 in FIG. 3.

As depicted, coordinate system 400 includes x-axis 402, y-axis 404, and z-axis 406. Y-axis 404 is a line of sight for the sensor array in this illustrative example. X-axis 402 may be x-axis 305 in FIG. 3. Z-axis 406 may be z-axis 307 in FIG. 3.

In this illustrative example, azimuth angle 408 is an azimuth angle relative to the line of sight. Elevation angle 410 is an elevation angle relative to the line of sight.

Figure 5:
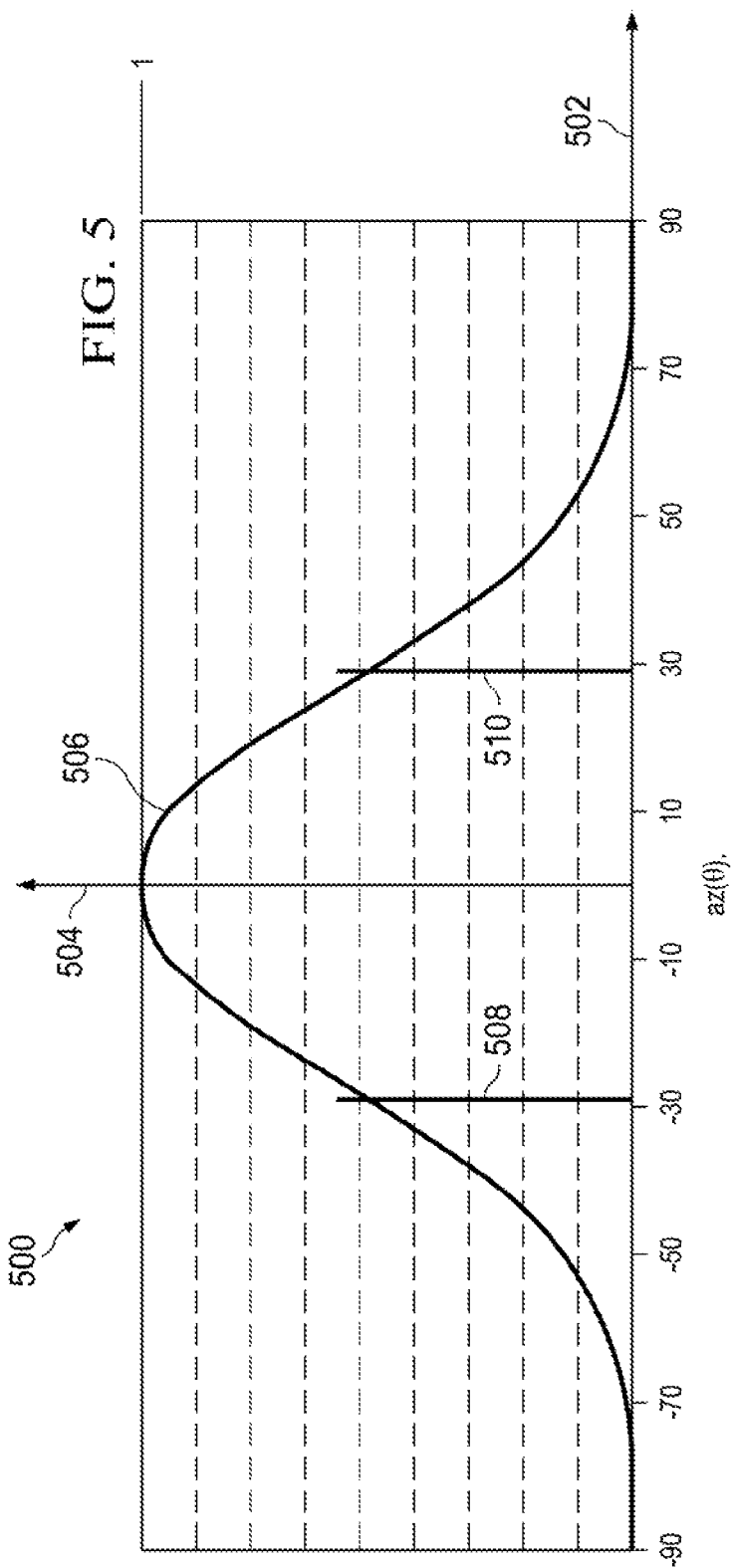
FIG. 5 is an illustration of a graph of responsivity for a formed beam of a number of beams in accordance with an advantageous embodiment.

With reference now to FIG. 5, an illustration of a graph of responsivity for a beam in a number of beams is depicted in accordance with an advantageous embodiment. In this illustrative example, graph 500 is for the responsivity for a beam in number of beams 130 in FIG. 1. Graph 500 includes horizontal axis 502, vertical axis 504, and curve 506.

As depicted, horizontal axis 502 is an azimuth angle. This azimuth angle may be, for example, azimuth angle 408 in FIG. 4 and/or azimuth angle 137 in FIG. 1. The azimuth angle is the angle from which sound may be detected by a microphone in a sensor array, such as sensor array 108 in FIG. 1 and/or sensor array 300 in FIG. 3. In other words, the azimuth angle is the angle at which a sound wave reaches the microphone. The azimuth angle may range from about negative 90 degrees to about positive 90 degrees relative to a line of sight for the sensor array.

Further, vertical axis 504 is responsivity for the beam in the sensor array. Responsivity for the beam has been normalized to one in this depicted example. Curve 506 indicates the change in responsivity as the azimuth angle changes.

In this illustrative example, maximum responsivity occurs at an azimuth angle of about zero degrees relative to the line of sight for the sensor array. Point 508 and point 510 indicate the azimuth angles at which responsivity is about 50 percent of the maximum responsivity for the microphone. These points may also be referred to as half power points.

Although curve 506 is for responsivity with respect to the azimuth angle in this illustrative example, responsivity with respect to the elevation angle relative to the line of sight may have a curve substantially the same as curve 506.

In other words, the responsivity for the microphone is omnidirectional such that the responsivity with respect to elevation is substantially the same as the responsivity with respect to azimuth. Further, the responsivity curve for the microphone with respect to both the elevation angle and the azimuth angle is a three-dimensional curve. This three-dimensional curve corresponds to the responsivity of a beam formed by an array of microphones in which the beam is pointed in a direction of the line of sight for the array. In this illustrative example, the beam width is the width of the beam at the half power points for the responsivity.

Figure 6:
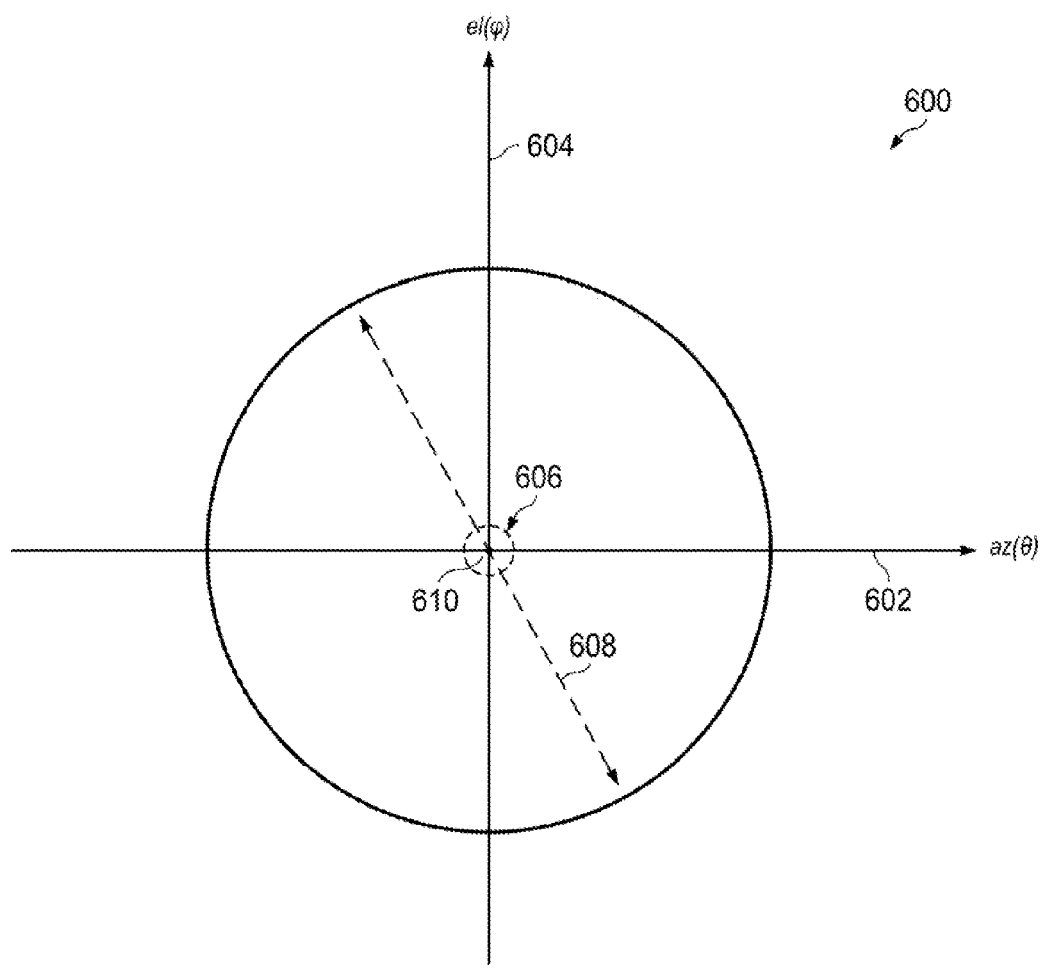
FIG. 6 is an illustration of a cross-sectional view of a beam in accordance with an advantageous embodiment.

With reference now to FIG. 6, an illustration of a cross-sectional view of a beam is depicted in accordance with an advantageous embodiment. In this illustrative example, a cross-sectional view of beam 600 is depicted. Beam 600 is an example of a beam in number of beams 130 in FIG. 1. As depicted, beam 600 is shown with respect to horizontal axis 602 and vertical axis 604.

In this illustrative example, horizontal axis 602 is an azimuth angle relative to a line of sight for a sensor array. The line of sight is at origin 606. Vertical axis 604 is an elevation angle relative to the line of sight for the sensor array.

Beam 600 has beam width 608 and center 610 in this depicted example. Beam width 608 is the diameter of the three-dimensional curve for the responsivity of the sensor array at which total responsivity for the sensor array is substantially equal to about 50 percent of a maximum responsivity for the sensor array. In other words, the cross-sectional view of beam 600 depicted is taken through the half power points for the responsivity for the sensor array.

As illustrated, center 610 of beam 600 is at origin 606, which is the point from which the line of sight for the sensor array emanates. In this illustrative example, center 610 of beam 600 is the selected direction for the beam. In other words, in this depicted example, the selected direction for beam 600 is substantially the same as the line of sight for the sensor array. Further, center 610 of beam 600 is the direction in which the responsivity for the sensor array in the selected direction is a maximum value.

Figure 7:
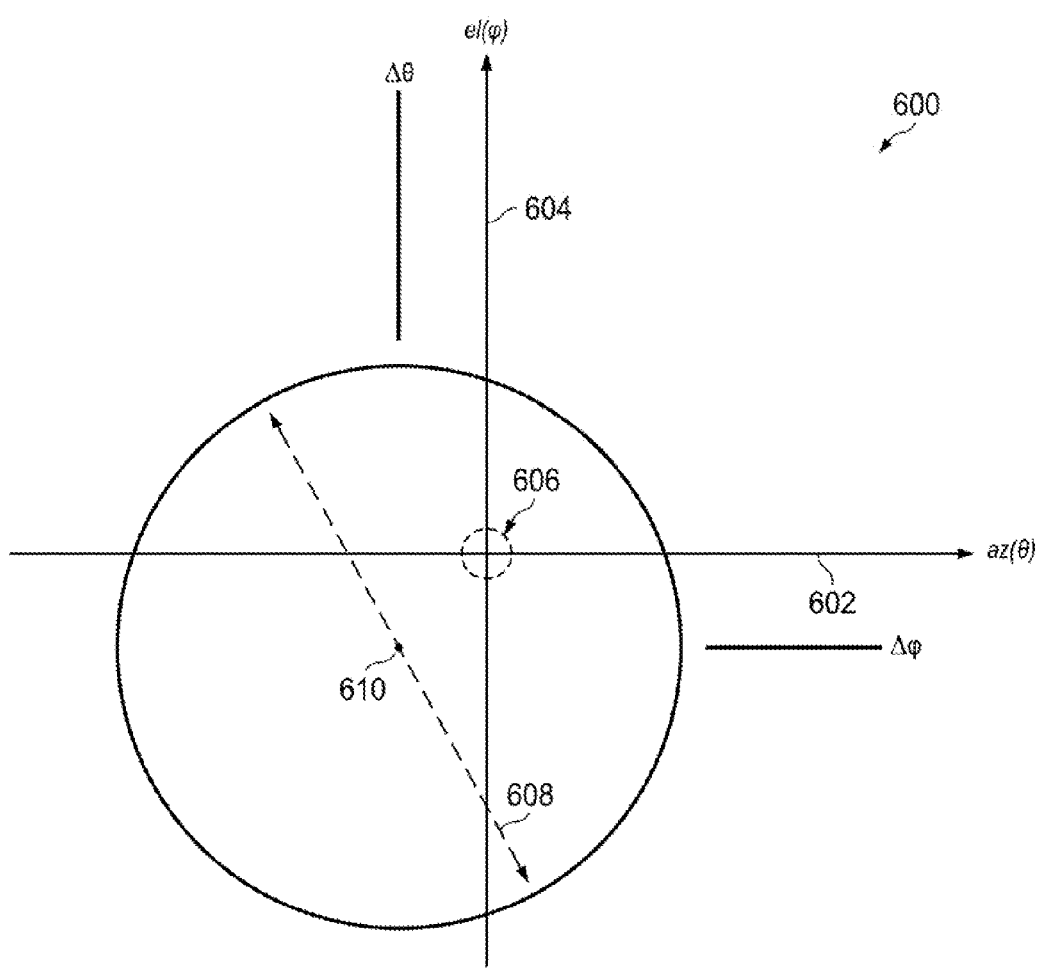
FIG. 7 is an illustration of a beam in accordance with an advantageous embodiment.

With reference now to FIG. 7, an illustration of a beam is depicted in accordance with an advantageous embodiment. In this illustrative example, the direction in which beam 600 from FIG. 6 is pointed has been changed. In other words, the selected direction for beam 600 has been changed relative to the line of sight for the sensor array. As depicted, center 610 is moved $\Delta\theta$ degrees in azimuth in the direction of horizontal axis 602 relative to origin 606 and $\Delta\phi$ degrees in elevation in the direction of vertical axis 604 relative to origin 606.

Figure 8:
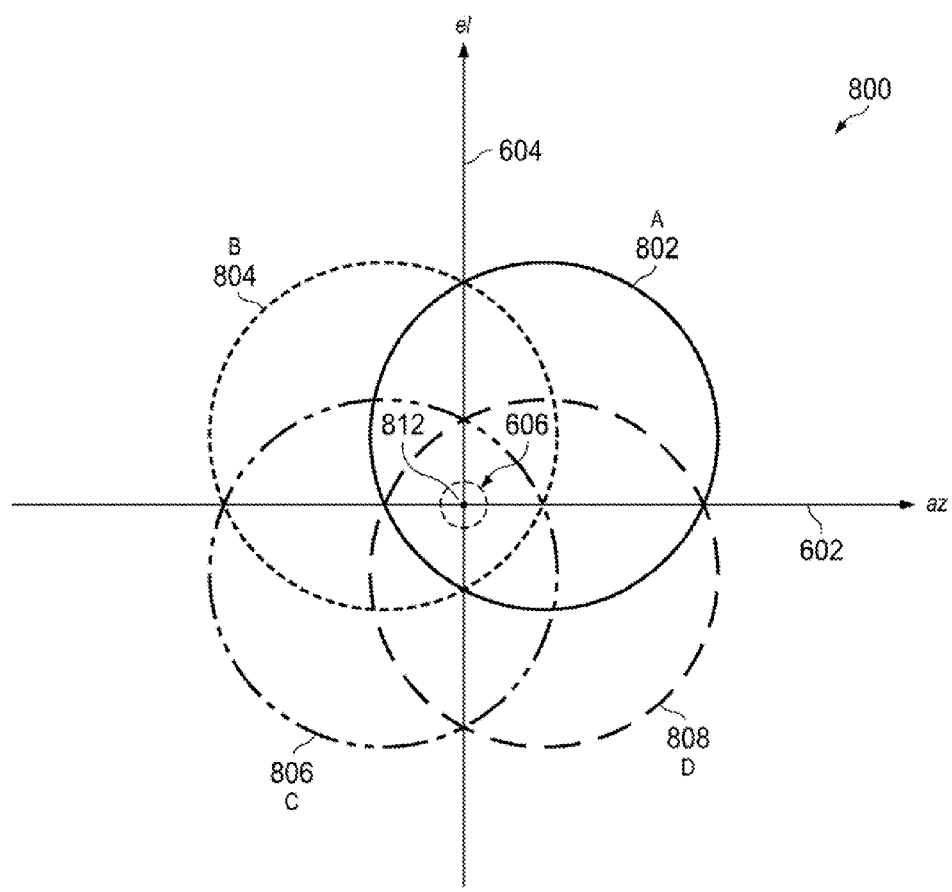
FIG. 8 is an illustration of a number of beams in accordance with an advantageous embodiment.

With reference now to FIG. 8, an illustration of a number of beams is depicted in accordance with an advantageous embodiment. In this illustrative example, beams 800 are depicted with respect to horizontal axis 602 and vertical axis 604 from FIG. 6. As depicted, beams 800 include beam A 802, beam B 804, beam C 806, and beam D 808. Beams 800 may be formed using, for example, signal processing module 128 in FIG. 1.

In this illustrative example, beams 800 form configuration 810 with center 812. Configuration 810 is a four-beam configuration. Center 812 corresponds to a center direction for beams 800. In this illustrative example, center 812 is substantially equidistant from the centers of beam A 802, beam B 804, beam C 806, and beam D 808. Further, center 812 is at origin 606.

In this depicted example, beams 800 may be used to detect sounds. In this illustrative example, when the sounds detected by the sensor array come from the direction corresponding to center 812 of beams 800, the outputs of all beams 800 may be substantially equal.

Figure 9:
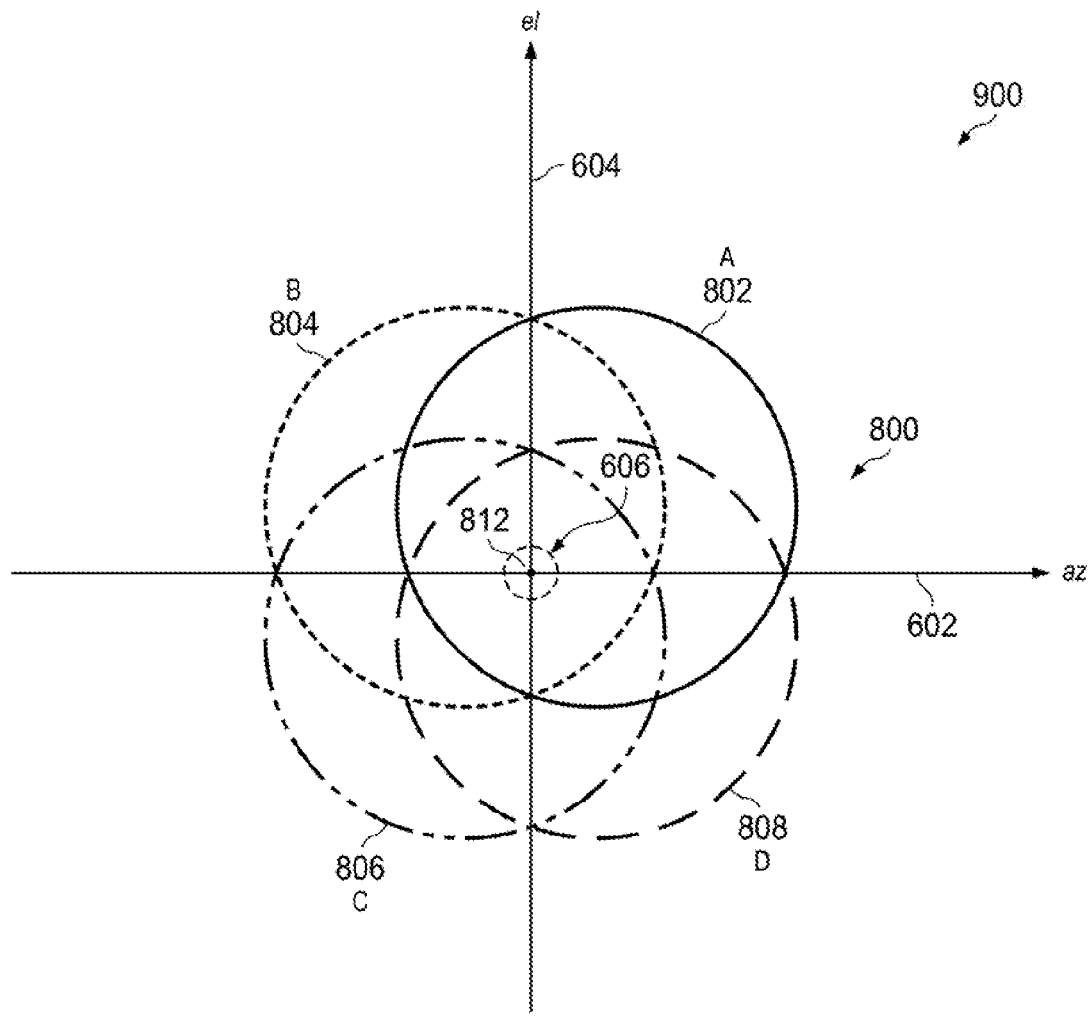
FIG. 9 is an illustration of a number of beams in accordance with an advantageous embodiment.

With reference now to FIG. 9, an illustration of a number of beams is depicted in accordance with an advantageous embodiment. In this illustrative example, beams 800 from FIG. 8 have configuration 900. With configuration 900, beams 800 are more tightly grouped as compared to beams 800 with configuration 810 in FIG. 8.

Figure 10:
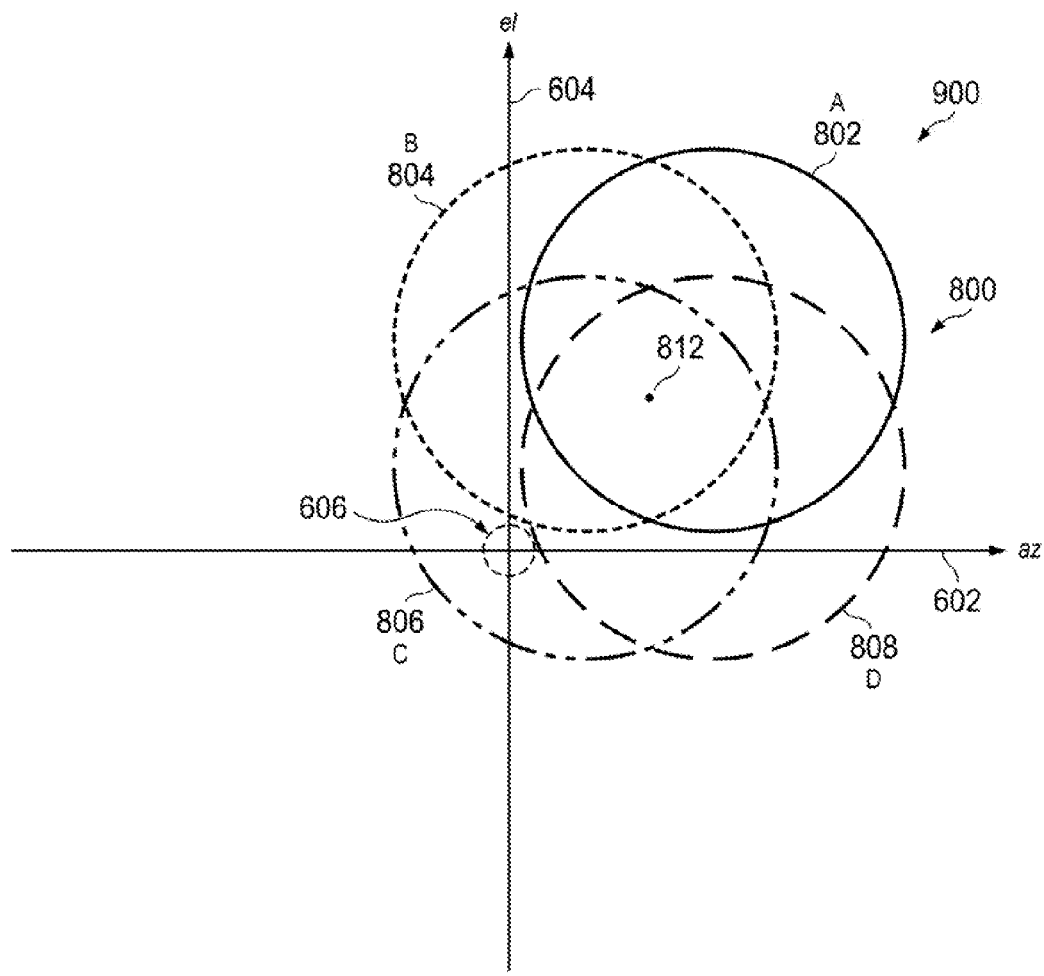
FIG. 10 is an illustration of a number of beams in accordance with an advantageous embodiment.

Turning now to FIG. 10, an illustration of a number of beams is depicted in accordance with an advantageous embodiment. In this illustrative example, beams 800 with configuration 900 from FIG. 9 have been pointed in different directions in FIG. 10, as compared to beams 800 in FIG. 8. In other words, in this depicted example, the directions for beams have been changed relative to the line of sight for the array.

Figure 11:
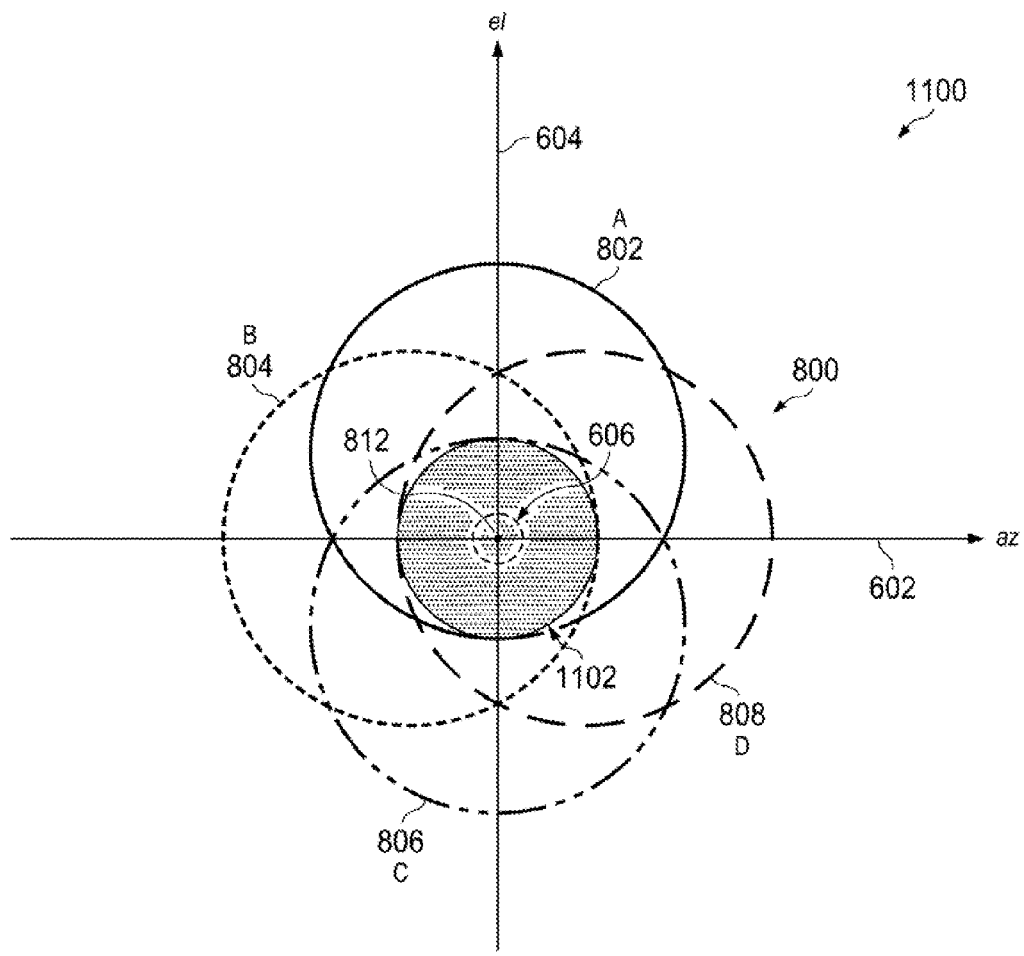
FIG. 11 is an illustration of a number of beams in accordance with an advantageous embodiment.

Turning now to FIG. 11, an illustration of a number of beams is depicted in accordance with an advantageous embodiment. In this illustrative example, configuration 900 for beams 800 in FIG. 9 has been rotated by about 90 degrees counterclockwise to form configuration 1100 for beams 800.

In this depicted example, beams 800 with configuration 1100 may be moved relative to horizontal axis 602 and vertical axis 604. In other words, beams 800 may be moved in azimuth and in elevation to scan for sounds generated by objects of interest. As one illustrative example, beams 800 may be moved to scan for sounds using a predetermined search pattern, such as a spiral search pattern, a raster scan pattern, or some other pattern for scanning.

A policy, such as policy 142 in FIG. 1, may be used to detect sounds generated by objects of interest. For example, the policy may include criteria for detection. The criteria may be that a sound generated by an object of interest is detected when the output of all or some selected number of beams in configuration 1100 of beams 800 is above a selected threshold value. The selected threshold may be, for example, the half power points for the beams.

For example, if an object of interest is located in a direction corresponding to area 1102, then the likelihood of detecting the object of interest by the sounds generated by the object of interest is very high.

The illustration of beams 800 in FIGS. 8-11 is not meant to imply physical or architectural limitations to the manner in which the different advantageous embodiments may be implemented. Any number of beams may be formed simultaneously and scanned across the field of regard for the sensor array.

For example, beam B 804 and beam D 808 in configuration 1100 without beam A 802 and beam C 806 may be formed and scanned across the field of regard for the sensor array. Beam B 804 and beam D 808 have center 812. Beam B 804 and beam D 808 are used to find the direction from which the sound is detected with respect to the azimuth angle.

When a sound detected is identified as being generated by an object of interest, the signal processing module identifies the direction from which the sound is directed with respect to the azimuth angle as follows:

$$\theta_{calculated} = \left[ \frac{\frac{[B_{D\_measured} - B_{B\_measured}]}{[B_{D\_measured} + B_{B\_measured}]}}{\left[ \frac{[B_D(\theta_{right}, 0) - B_B(\theta_{right}, 0)]}{[B_D(\theta_{right}, 0) + B_B(\theta_{right}, 0)]} - \frac{[B_D(\theta_{left}, 0) - B_B(\theta_{left}, 0)]}{[B_D(\theta_{left}, 0) + B_B(\theta_{left}, 0)]} \right]} \right] \cdot [\theta_{right} - \theta_{left}] + \theta_{center} \quad (1)$$

where $\theta_{calculated}$ is the calculated azimuth angle from the line of sight at origin 606, B is for beam B 804, D is for beam D 808, $B_{B\_measured}$ is the measured output for beam B 804, and $B_{D\_measured}$ is the measured output for beam D 808; where $$\theta_{center} = \frac{(\Delta\theta_D + \Delta\theta_B)}{2} \quad (2)$$

in which $\theta_{center}$ is center 812 between the center of beam B 804, $\Delta\theta_B$, and the center of beam D 808; where $$\theta_{right} = [\theta_{center} + \Delta\theta_{right}] \leq \Delta\theta_D \quad (3)$$

and $$\theta_{left} = [\theta_{center} - \Delta\theta_{left}] \geq \Delta\theta_B \quad (4)$$

in which $\theta_{right}$ and $\theta_{left}$ are points substantially equidistant from $\theta_{center}$ and in which $\Delta\theta_{right}$ is an angular distance in azimuth from $\theta_{center}$ and $\Delta\theta_{left}$ is an angular distance in azimuth from the center $\theta_{center}$, and $$B(\theta, \varphi) = \left| \sum_{i=1}^{n} R_i(f_c, \theta) \cdot e^{j \cdot k_c \cdot x_i \cdot d_x \cdot [sin(\theta) \cdot cos(\varphi) - sin(\Delta\theta) \cdot cos(\Delta\varphi)]} \cdot R_i(f_c, \varphi) \cdot e^{j \cdot k_c \cdot z_i \cdot d_z \cdot [sin(\varphi) - sin(\Delta\varphi)]} \right| \quad (5)$$

where i is the $i^{th}$ microphone in the sensor array, n is the total number of microphones in the sensor array, $R_i$ is the responsivity of the $i^{th}$ microphone, $f_c$ is a center frequency of the sound, j is the imaginary number equal to the square root of −1, $x_i*d_x$ is the distance of the $i^{th}$ microphone from the z-axis for the sensor array, $z_i*d_z$ is the distance of the $i^{th}$ microphone from the x-axis for the sensor array, e is the exponential function, and $$k_c = \frac{2 \cdot \pi}{\lambda_c} = \frac{2 \cdot \pi \cdot f_c}{v_s}, \quad (6)$$

where $$\lambda_c = \frac{v_s}{f_c}, \quad (7)$$

and where $v_s$ is the speed of sound. In these illustrative examples, equation 6 is used to model a beam.

As one illustrative example, for sensor array 300 in FIG. 3 with 19 microphones, the values for $x_i$ and $z_i$ for each $i^{th}$ microphone in sensor array 300 may be defined as described in Table 1.

TABLE 1

| i | $z_i$ | $x_i$ |
|---|---|---|
| 1 | 0 | 0 |
| 2 | 0.5 | 0.866 |
| 3 | 1 | 0 |
| 4 | 0.5 | −0.866 |
| 5 | −0.5 | −0.866 |
| 6 | −1 | 0 |
| 7 | −0.5 | 0.866 |
| 8 | 0 | 2*.866 |
| 9 | 1 | 2*.866 |
| 10 | 1.5 | 0.866 |
| 11 | 2 | 0 |
| 12 | 1.5 | −0.866 |
| 13 | 1 | −1.732 |
| 14 | 0 | −1.732 |
| 15 | −1 | −1.732 |
| 16 | −1.5 | −0.866 |
| 17 | −2 | 0 |
| 18 | −1.5 | 0.866 |
| 19 | −1 | 2*.866 |
| ... | ... | ... |

In this manner, $\theta_{calculated}$ may be estimated for the direction from which the sound is detected with respect to the azimuth angle from the line of sight at origin 606.

Similarly, beam A 802 and beam C 806 may be formed simultaneously and scanned across the field of regard for the sensor array. Beam A 802 and beam C 806 have center 812. Beam A 802 and beam C 806 are used to find the direction from which the sound is detected with respect to the elevation angle as follows:

$$\varphi_{calculated} = \left[ \frac{\frac{[B_{A\_measured} - B_{C\_measured}]}{[B_{A\_measured} + B_{C\_measured}]}}{\frac{[B_A(0, \varphi_{top}) - B_C(0, \varphi_{top})]}{[B_A(0, \varphi_{top}) + B_C(0, \varphi_{top})]} - \frac{[B_A(0, \varphi_{bottom}) - B_C(0, \varphi_{bottom})]}{[B_A(0, \varphi_{bottom}) + B_C(0, \varphi_{bottom})]}} \right] \cdot [\varphi_{top} - \varphi_{bottom}] + \varphi_{center} \quad (8)$$

where $\varphi_{calculated}$ is the calculated elevation angle from the line of sight at origin 606, A is for beam A 802, C is for beam C 806, $B_{A\_measured}$ is the output for beam A 802, and $B_{C\_measured}$ is the output for beam C 806; where $$\varphi_{center} = \frac{(\Delta\varphi_A + \Delta\varphi_C)}{2} \quad (9)$$

in which $\phi_{center}$ is center 812 between the center of beam A 802, $\Delta\phi_A$, and the center of beam C 806, $\Delta\phi_C$; where $$\phi_{top} = [\phi_{center} + \Delta\phi_{top}] \le \Delta\phi_A \quad (10)$$

and $$\phi_{bottom} = [\phi_{center} + \Delta\phi_{bottom}] \ge \Delta\phi_C \quad (11)$$

in which $\phi_{top}$ and $\phi_{bottom}$ are points substantially equidistant from $\phi_{center}$, and in which $\Delta\phi_{top}$ is an angular distance in elevation from $\phi_{center}$, $\Delta\phi_{bottom}$ is an angular distance in elevation from $\phi_{center}$.

Figure 12:
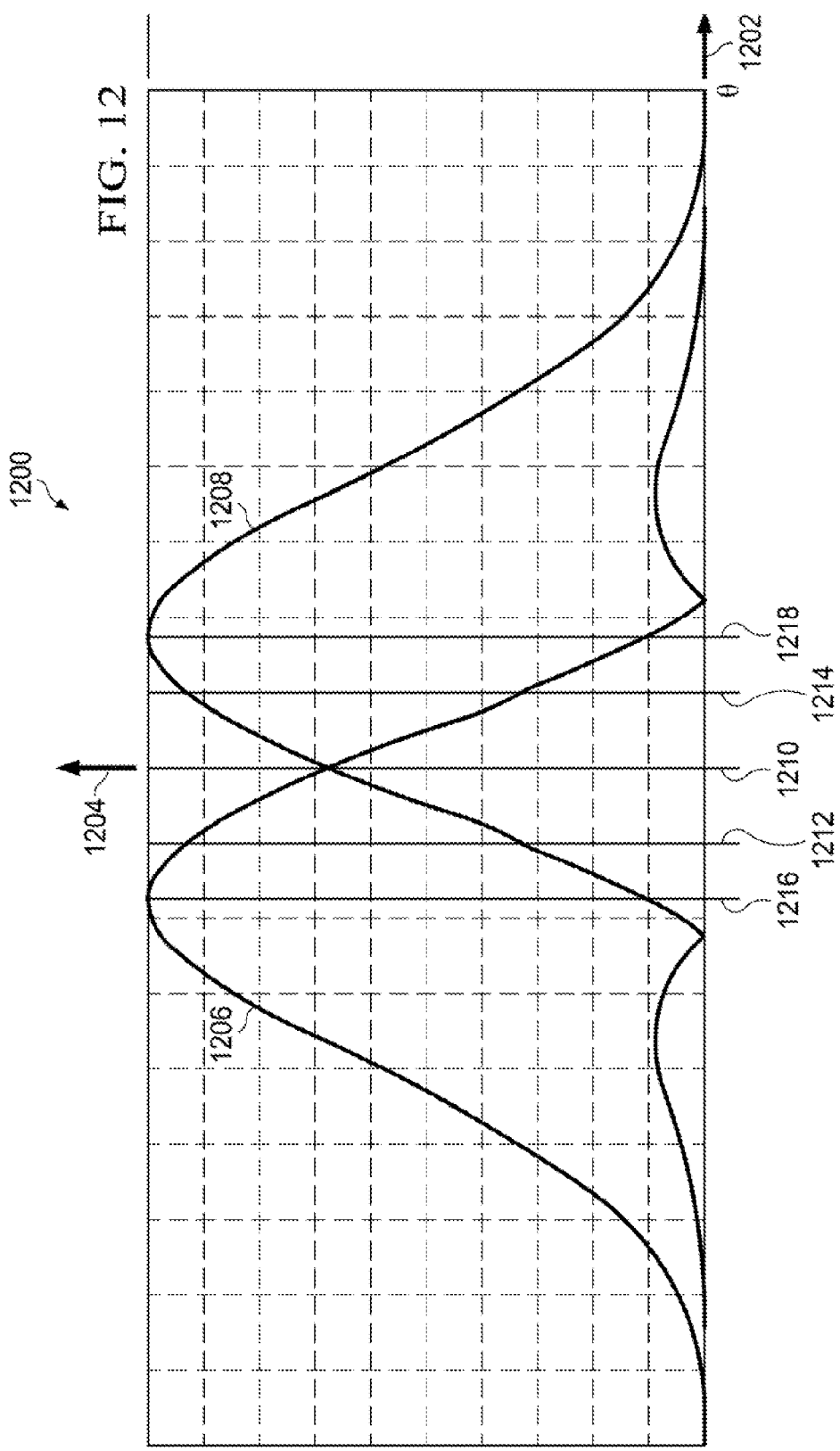
FIG. 12 is an illustration of a graph for the responsivity of beams in accordance with an advantageous embodiment.

With reference now to FIG. 12, an illustration of a graph for the responsivity of beams is depicted in accordance with an advantageous embodiment. In this illustrative example, graph 1200 shows the responsivity for beam B 804 and beam D 808 with configuration 1100 in FIG. 11. Graph 1200 includes horizontal axis 1202 and vertical axis 1204. Horizontal axis 1202 is an azimuth angle with respect to origin 606 in FIG. 11, and vertical axis 1204 is responsivity.

As depicted, graph 1200 also includes curve 1206 and curve 1208. Curve 1206 is the responsivity for beam B 804 normalized to one, and curve 1208 is the responsivity for beam D 808 normalized to one.

As depicted, line 1210 indicates center 812, $\theta_{center}$, which is the center between beam B 804 and beam D 808. Line 1212 indicates $\theta_{center} - \Delta\theta_{left}$. Line 1214 indicates $\theta_{center} + \Delta\theta_{right}$. Line 1216 indicates the center of beam B 804 in azimuth angle. Line 1218 indicates the center of beam D 808 in azimuth angle.

Figure 13:
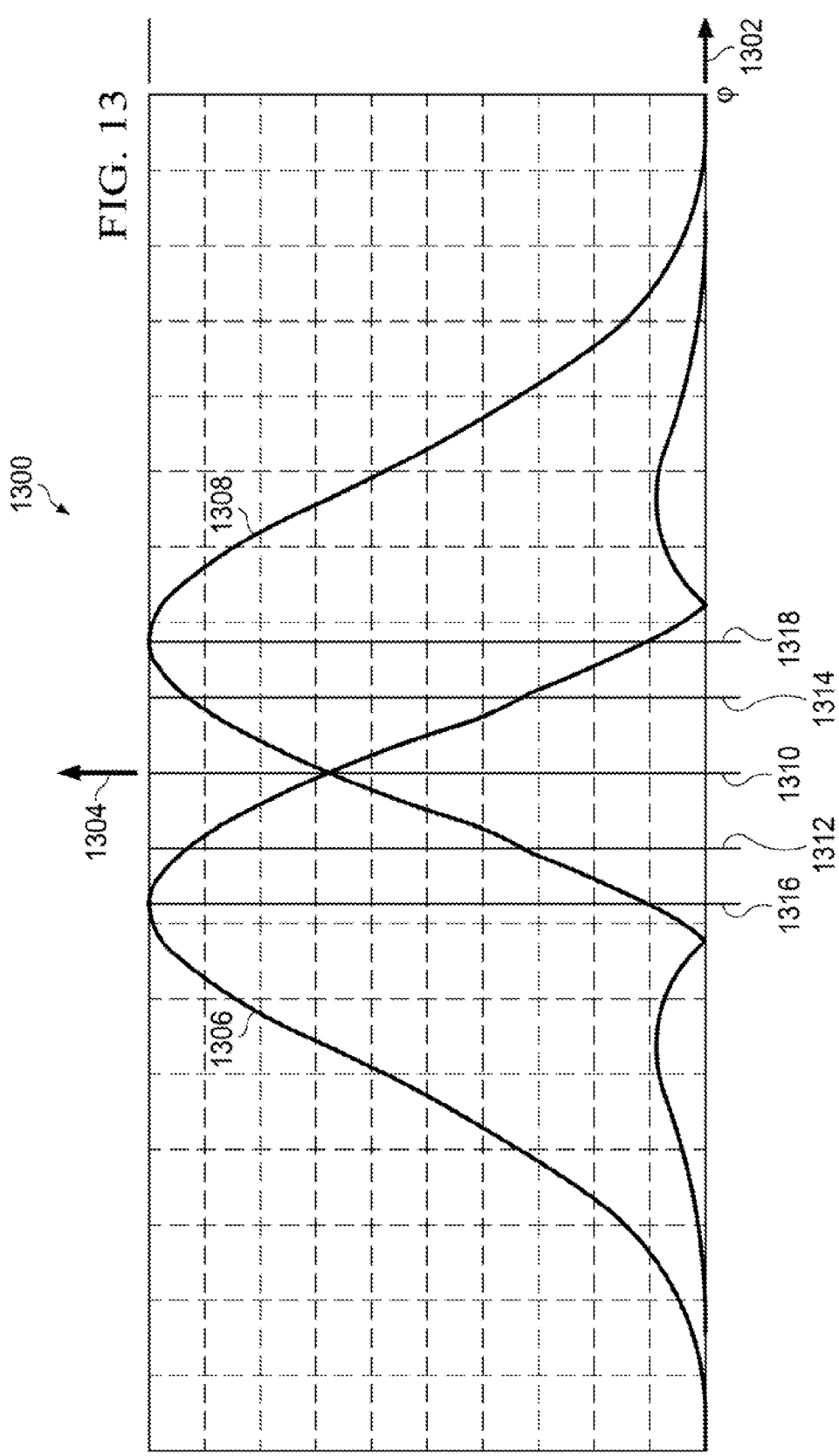
FIG. 13 is an illustration of a graph for the responsivity of beams in accordance with an advantageous embodiment.

With reference now to FIG. 13, an illustration of a graph for the responsivity of beams is depicted in accordance with an advantageous embodiment. In this illustrative example, graph 1300 shows the responsivity for beam A 802 and beam C 806 with configuration 1100 in FIG. 11. Graph 1300 includes horizontal axis 1302 and vertical axis 1304. Horizontal axis 1302 is an elevation angle with respect to origin 606 in FIG. 11, and vertical axis 1304 is responsivity.

As depicted, graph 1300 also includes curve 1306 and curve 1308. Curve 1306 is the responsivity for beam A 802 normalized to one, and curve 1308 is the responsivity for beam C 806 normalized to one.

As depicted, line 1310 indicates center 812, $\phi_{center}$, which is the center between beam B 804 and beam D 808. Line 1312 indicates $\phi_{center} - \Delta\phi_{bottom}$. Line 1314 indicates $\phi_{center} + \Delta\phi_{top}$. Line 1316 indicates the center of beam A 802 in elevation angle. Line 1318 indicates the center of beam C 806 in elevation angle.

Figure 14:
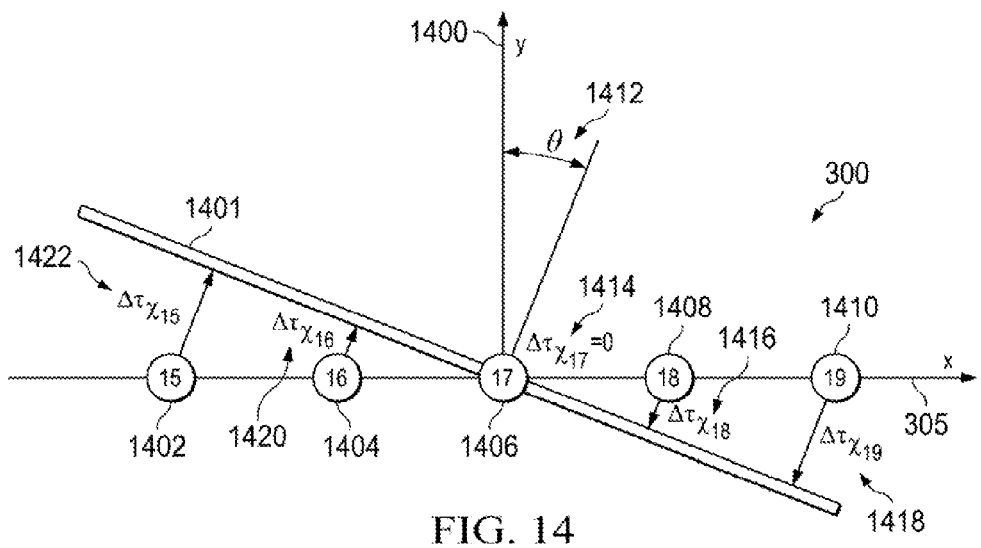
FIG. 14 is an illustration of a side view of a sensor array in accordance with an advantageous embodiment.

With reference now to FIG. 14, an illustration of a side view of a sensor array is depicted in accordance with an advantageous embodiment. In this illustrative example, a side view of sensor array 300 from FIG. 3 is depicted. As depicted, sensor array 300 is depicted with respect to y-axis 1400 and x-axis 305. Y-axis 1400 is the line of sight for sensor array 300.

As depicted, microphones 1402, 1404, 1406, 1408, and 1410 are depicted in this side view of sensor array 300. In this illustrative example, wave front 1401 or sound hits sensor array 300 at angle 1412 relative to y-axis 1400.

In this depicted example, wave front 1401 hits microphone 1406 at time 1414. Based on time 1414, wave front 1401 hit microphone 1408 at time 1416 and microphone 1410 at time 1418 relative to time 1414. Time 1416 is the difference between time 1414 and the time at which wave front 1401 hits microphone 1408. Time 1418 is the difference between time 1414 at the time at which wave front 1401 hits microphone 1410. Time 1418 is greater than time 1416.

Further, based on time 1414 at which wave front 1401 hits microphone 1406, wave front 1401 will hit microphone 1404 at time 1420 and microphone 1402 at time 1422 relative to time 1414. Time 1420 is the difference between time 1414 and the time at which wave front 1401 will hit microphone 1404. Time 1422 is the difference between time 1414 and the time at which wave front 1401 will hit microphone 1402. Time 1422 is greater than time 1420.

Based on the different times that a wave front hits the different microphones in a sensor array, time delays need to be calculated for the electrical signals generated by the microphones. The azimuth phase component of equation 6 is:

$$\Theta_{x_i}(\theta,\phi) = k_c \cdot x_i \cdot d_x \cdot [\sin(\theta) \cdot \cos(\phi) - \sin(\Delta\theta) \cdot \cos(\Delta\phi)], \quad (12)$$

which equals $$\Theta_{x_i}(\theta, \varphi) = \frac{2 \cdot \pi \cdot f_c}{v_s} \cdot x_i \cdot d_x \cdot [\sin(\theta) \cdot \cos(\varphi) - \sin(\Delta\theta) \cdot \cos(\Delta\varphi)] \quad (13)$$

where $\Theta_{x_i}$ is the azimuth phase component of equation 6. Then, $$\Delta t_{x_i}(\Delta\theta, \Delta\varphi) = \frac{-x_i \cdot d_x \cdot \sin(\Delta\theta) \cdot \cos(\Delta\varphi)}{v_s}, \quad (14)$$

where $\Delta t_{x_i}$ is the time delay with respect to the line of sight or center of the sensor array for the $i^{th}$ element in the direction of the x-axis for a given $\Delta\theta$ and a given $\Delta\phi$, where $\Delta\theta$ is a difference in azimuth angle in degrees and $\Delta\theta$ is a difference in elevation angle in degrees.

Similarly, the elevation phase component of equation 6 is:

$$\Theta_{z_i}(\theta, \varphi) = \frac{2 \cdot \pi \cdot f_c}{v_s} \cdot z_i \cdot d_z \cdot [\sin(\varphi) - \sin(\Delta\varphi)], \quad (15)$$

where $\Theta_{z_i}$ is the elevation phase component of equation 6. Then, $$\Delta t_{z_i}(\Delta\varphi) = \frac{-z_i \cdot d_z \cdot \sin(\Delta\varphi)}{v_s}, \quad (16)$$

where $\Delta t_{z_i}$ is the time delay with respect to the line of sight or center of the sensor array for the $i^{th}$ element in the direction of the z-axis for a given $\Delta\phi$.

The output of a beam for a desired azimuth angle and a desired elevation angle is defined as follows:

$$B_{measured}(\Delta\theta, \Delta\varphi) = \sum_{i=1}^{n} R_i(\Delta t_{x_i} - \min\{\Delta t_{x_1}, \Delta t_{x_2} \ldots \Delta t_{x_n}\}) \cdot \quad (17)$$

$$R_i(\Delta t_{z_i} - \min\{\Delta t_{z_1}, \Delta t_{z_2} \ldots \Delta t_{z_n}\}).$$

Each time a beam is moved in azimuth and/or elevation, the time delays need to be recalculated.

The phase portion of equation 6 depends on the center frequency and on the band-pass of the sound being detected. The higher the center frequency, the smaller the wavelength and the closer the microphones need to be arranged in the phased array pattern to avoid side-lobes.

In these different illustrative examples, a low-frequency low-pass filter can be used to cut out unnecessary high frequency sounds. Further, the system may be band-limited at the high frequency end to limit how close the spacing between the microphones in the sensor array needs to be. Additionally, the remaining frequency band may be divided into smaller sub-bands to reduce frequency variation and phase variation when forming beams. Each sub-band will have its own set of time-delays per microphone.

Figure 15:
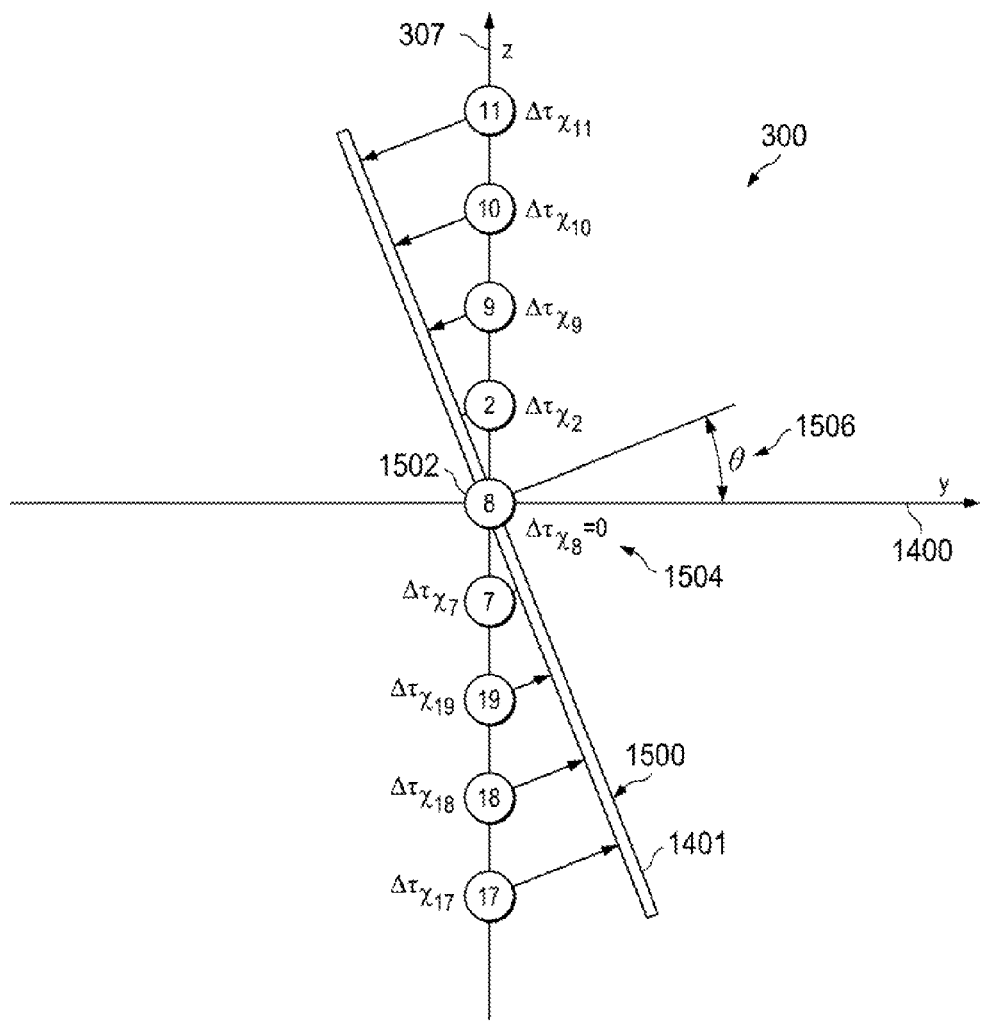
FIG. 15 is an illustration of a side view of a sensor array in accordance with an advantageous embodiment.

With reference now to FIG. 15, an illustration of a side view of a sensor array is depicted in accordance with an advantageous embodiment. In this illustrative example, a side view of sensor array 300 from FIG. 3 is depicted. As depicted, sensor array 300 is depicted with respect to y-axis 1400 from FIG. 14 and z-axis 307. Y-axis 1400 is the line of sight for sensor array 300. As depicted, wave front 1500 hits microphone 1502 at time 1504. Wave front 1500 hits sensor array 300 at elevation angle 1506.

Figure 16:
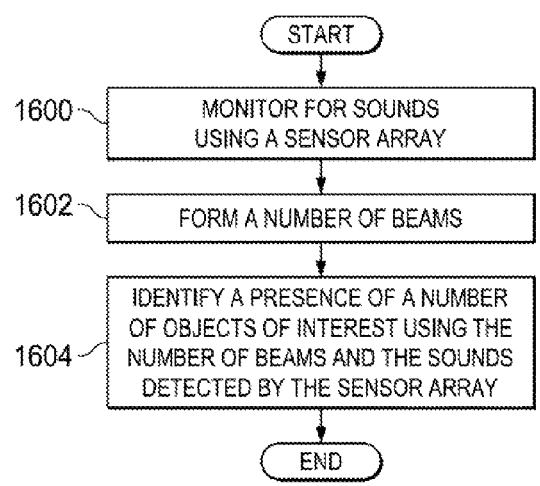
FIG. 16 is an illustration of a flowchart of a process for detecting objects of interest using sounds in accordance with an advantageous embodiment.

With reference now to FIG. 16, an illustration of a flowchart of a process for detecting objects of interest using sounds is depicted in accordance with an advantageous embodiment. The process illustrated in FIG. 16 may be implemented using detection system 102 in detection environment 100 in FIG. 1.

The process begins by monitoring for sounds using a sensor array (operation 1600). The sensor array comprises a plurality of microphones arranged in a pattern. The process then forms a number of beams (operation 1602). Each beam in the number of beams is formed for a selected direction in which the selected direction for each beam is relative to a line of sight for the sensor array.

Thereafter, the process identifies a presence of a number of objects of interest using the number of beams and the sounds detected by the sensor array (operation 1604), with the process terminating thereafter.

Figure 17:
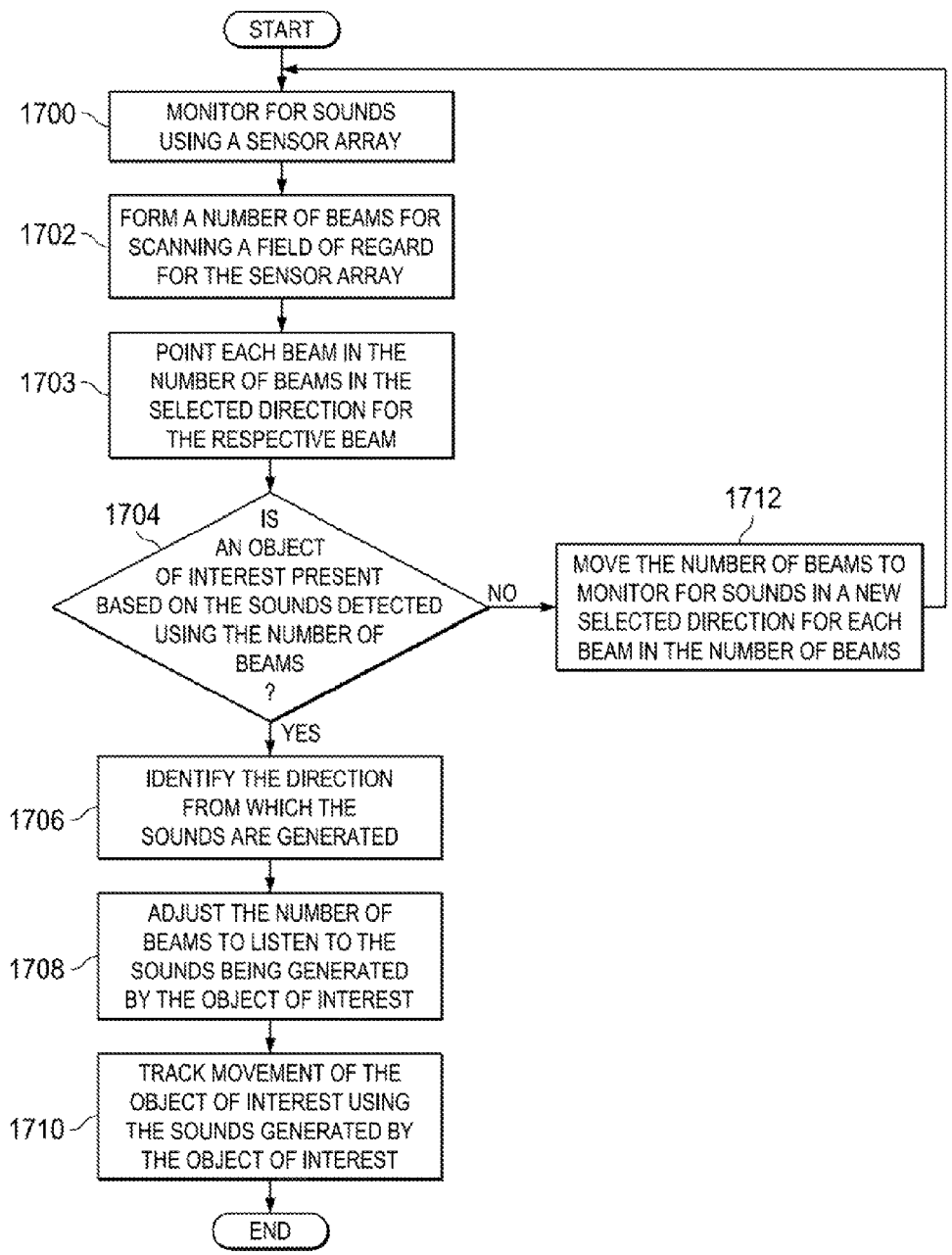
FIG. 17 is an illustration of a flowchart of a process for detecting objects of interest using sounds in accordance with an advantageous embodiment.

With reference now to FIG. 17, an illustration of a flowchart of a process for detecting objects of interest using sounds is depicted in accordance with an advantageous embodiment. The process illustrated in FIG. 17 may be implemented using detection system 112 in detection environment 110 in FIG. 1.

The process begins by monitoring for sounds using a sensor array (operation 1700). The sensor array comprises a plurality of microphones arranged in a pattern. The process then forms a number of beams for scanning a field of regard for the sensor array (operation 1702). Each beam is formed for a selected direction. The selected direction comprises an azimuth angle and an elevation angle. The process points each beam in the number of beams in the selected direction for the respective beam (operation 1703).

Thereafter, the process determines whether an object of interest is present based on the sounds detected using the number of beams (operation 1704). Operation 1704 may be performed using, for example, policy 142 in FIG. 1. The outputs for the number of beams are processed. Detected sounds are determined to be generated by objects of interest when the outputs for the number of beams are greater than a selected threshold. In this manner, the presence of an object of interest may be identified.

If an object of interest is present, the process identifies the direction from which the sounds are generated (operation 1706). Thereafter, the process adjusts the number of beams to listen to the sounds being generated by the object of interest (operation 1708). Further, the process tracks movement of the object of interest using the sounds generated by the object of interest (operation 1710), with the process terminating thereafter.

With reference again to operation 1704, if the presence of an object of interest is not detected, the process moves the number of beams to monitor for sounds in a new selected direction for each beam in the number of beams (operation 1712). The process then returns to operation 1700 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

In this manner, the different advantageous embodiments provide a method and apparatus for detecting objects of interest using sounds. Sounds are monitored for using a sensor array. A number of beams are formed. Each beam in the number of beams is formed for a selected direction in which the selected direction for each beam is relative to a line of sight for the sensor array. A presence of a number of objects of interest is identified using the number of beams and the sounds detected by the sensor array.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting objects of interest using sounds, the method comprising:
    monitoring for the sounds using a sensor array of a plurality of microphones arranged in a uniform hexagonal array pattern;
    forming a number of beams, wherein each beam in the number of beams is formed for a selected direction in which the selected direction for the each beam is relative to a line of sight for the sensor array; and
    identifying a presence of a number of objects of interest using the number of beams and the sounds detected by the sensor array.

2. The method of claim 1 further comprising:
    identifying a direction relative to the line of sight for the sensor array in which the number of objects of interest is present using the number of beams.

3. The method of claim 1, wherein the plurality of microphones being configured to generate electrical signals in response to detecting the sounds, and wherein the step of forming the number of beams comprises:
identifying the selected direction for the each beam in the number of beams; and
forming the each beam in the number of beams using a responsivity for each microphone in the plurality of microphones and the selected direction for the each beam, wherein the each beam in the number of beams is formed for the selected direction in which the selected direction for the each beam is relative to the line of sight for the sensor array.

4. The method of claim 3, wherein the step of forming the each beam in the number of beams using the responsivity for the each microphone in the plurality of microphones and the selected direction for the each beam, wherein the each beam in the number of beams is pointed in the selected direction in which the selected direction for the each beam is relative to the line of sight for the sensor array comprises:
identifying a number of sets of time delays for the electrical signals generated by the plurality of microphones based on the selected direction for the each beam in the number of beams, wherein each set of time delays in the number of sets of time delays corresponds to a beam in the number of beams; and
applying the number of sets of time delays to the electrical signals generated by the plurality of microphones.

5. The method of claim 4 further comprising:
generating a number of outputs for the number of beams.

6. The method of claim 5, wherein the step of generating the number of outputs for the number of beams comprises:
summing the electrical signals after a set of time delays in the number of sets of time delays corresponding to the beam in the number of beams is applied to the electrical signals to generate an output in the number of outputs for the beam.

7. The method of claim 6, wherein the step of identifying the presence of the number of objects of interest using the number of beams and the sounds detected by the sensor array comprises:
identifying the presence of the number of objects of interest using the output for the each beam in the number of beams, the sounds detected by the sensor array, and a policy.

8. The method of claim 2, wherein the direction and the selected direction comprise an elevation angle and an azimuth angle relative to the line of sight for the sensor array.

9. The method of claim 1, wherein the microphones are selected from a group comprising an omnidirectional microphone, a piezoelectric microphone, a semiconductor-type microphone, and a unidirectional microphone.

10. The method of claim 1 further comprising:
changing the selected direction for the each beam in the number of beams.

11. The method of claim 2 further comprising:
responsive to identifying the direction relative to the line of sight for the sensor array in which the number of objects is present using the number of beams, changing the selected direction for the each beam in at least a portion of the number of beams such that the selected direction is substantially the same as the direction relative to the line of sight for the sensor array in which the number of objects is present.

12. The method of claim 2 further comprising:
tracking movement of the number of objects of interest generating the sounds using the number of beams.

13. An apparatus comprising:
a sensor array configured to monitor for sounds, the sensor array including a plurality of microphones arranged in a uniform hexagonal array pattern; and
a computer system associated with the sensor array and configured to
form a number of beams, wherein each beam in the number of beams is formed for a selected direction in which the selected direction for the each beam is relative to a line of sight for the sensor array, and
identify a presence of a number of objects of interest using the number of beams and the sounds detected by the sensor array.

14. The apparatus of claim 13, wherein the computer system is further configured to identify a direction relative to the line of sight for the sensor array in which the number of objects of interest is present using the number of beams.

15. The apparatus of claim 13, wherein the plurality of microphones being configured to generate electrical signals in response to detecting the sounds, and wherein in being configured to form the number of beams, the computer system is configured to identify the selected direction for the each beam in the number of beams; and
the plurality of microphones form the each beam in the number of beams using a responsivity for each microphone in the plurality of microphones and the selected direction for the each beam, wherein the each beam in the number of beams is formed for the selected direction in which the selected direction for the each beam is relative to the line of sight for the sensor array.

16. The apparatus of claim 15, wherein in being configured to form the each beam in the number of beams using the responsivity for the each microphone in the plurality of microphones and the selected direction for the each beam, wherein the each beam in the number of beams is pointed in the selected direction in which the selected direction for the each beam is relative to the line of sight for the sensor array, the computer system is configured to identify a number of sets of time delays for the electrical signals generated by the plurality of microphones based on the selected direction for the each beam in the number of beams, wherein each set of time delays in the number of sets of time delays corresponds to a beam in the number of beams; and apply the number of sets of time delays to the electrical signals generated by the plurality of microphones.

17. The apparatus of claim 16, wherein the computer system is further configured to generate a number of outputs for the number of beams.

18. The apparatus of claim 17, wherein in being configured to generate the number of outputs for the number of beams, the computer system is configured to sum the electrical signals after a set of time delays in the number of sets of time delays corresponding to the beam in the number of beams is applied to the electrical signals to generate an output in the number of outputs for the beam.

19. The apparatus of claim 16, wherein in being configured to identify the presence of the number of objects of interest using the number of beams and the sounds detected by the sensor array, the computer system is configured to identify the presence of the number of objects of interest using the output for the each beam in the number of beams, the sounds detected by the sensor array, and a policy.

20. The apparatus of claim 14, wherein the direction and the selected direction comprise an elevation angle and an azimuth angle relative to the line of sight for the sensor array.

21. The apparatus of claim 13, wherein the computer system is further configured to change the selected direction for the each beam in the number of beams.

22. The apparatus of claim 14, wherein the computer system is further configured to responsive to identifying the direction relative to the line of sight for the sensor array in which the number of objects is present using the number of beams, change the selected direction for the each beam in at least a portion of the number of beams such that the selected direction is substantially the same as the direction relative to the line of sight for the sensor array in which the number of objects is present.

\* \* \* \* \*